United States Patent [19]

Kuisma

[11] Patent Number: 4,831,492
[45] Date of Patent: May 16, 1989

[54] CAPACITOR CONSTRUCTION FOR USE IN PRESSURE TRANSDUCERS

[75] Inventor: Heikki Kuisma, Helsinki, Finland

[73] Assignee: Vaisala oy, Helsinki, Finland

[21] Appl. No.: 190,113

[22] Filed: May 4, 1988

[30] Foreign Application Priority Data

May 8, 1987 [FI] Finland ................................. 872049

[51] Int. Cl.⁴ .............................................. H01G 7/00
[52] U.S. Cl. ...................................... 361/283; 73/724
[58] Field of Search ................... 361/283; 73/718, 721, 73/724

[56] References Cited

U.S. PATENT DOCUMENTS

| | | | |
|---|---|---|---|
| 3,397,278 | 8/1968 | Pomerantz | 174/52 |
| 4,257,274 | 3/1981 | Shimada et al. | 73/718 |
| 4,542,435 | 9/1985 | Freud et al. | 361/283 |
| 4,589,054 | 5/1986 | Kuisma | 361/283 |
| 4,597,027 | 6/1986 | Lehto | 361/283 |
| 4,599,906 | 7/1986 | Freud et al. | 73/706 X |
| 4,609,966 | 9/1986 | Kuisma | 361/283 |
| 4,628,403 | 12/1986 | Kuisma | 361/283 |
| 4,730,496 | 3/1988 | Knecht et al. | 361/283 X |

FOREIGN PATENT DOCUMENTS 201230 10/1985 Japan ................................. 73/718

Primary Examiner—Donald A. Griffin
Attorney, Agent, or Firm—Birch, Stewart, Kolasch & Birch

[57] ABSTRACT

This publication discloses a capacitor construction for use in pressure transducers, including a substrate plate having of a silicon wafer and a thinner glass wafer. A first fixed capacitor plate is provided for overlying the substrate plate. A silicon plate is adapted to encircle the substrate plate with its thinned center area acting as a moving capacitor plate by virtue of its diaphragm behavior and a top plate overlying the silicon plate includes a silicon wafer and a glass wafer bonded to the silicon wafer and having a thickness essentially smaller than that of the silicon wafer. According to the invention, over the supporting substrate plate and between the first capacitor plate and its encircling silicon plate, is provided another overlying capacitor overlying plate, which essentially encloses the first capacitor plate. With this design, a reduced temperature sensitivity is accomplished in the capacitor construction.

3 Claims, 2 Drawing Sheets

CAPACITOR CONSTRUCTION FOR USE IN PRESSURE TRANSDUCERS

BACKGROUND OF THE INVENTION

1. Field of the Invention

The present invention relates to a capacitor construction for use in pressure transducers.

2. Related Prior Art

References to the prior art include the following patent publications:

[1] U.S. Pat. No. 4,589,054, (Kuisma);
[2] U.S. Pat. No. 4,597,027, (Lehto);
[3] U.S. Pat. No. 3,397,728, (Pomerantz);
[4] U.S. Pat. No. 4,609,966, (Kuisma);
[5] U.S. Pat. No. 4,599,906, (Freud et al.);
[6] U.S. Pat. No. 4,542,435, (Freud et al.);
[7] U.S. Pat. No. 4,257,274, (Shimade et al.);
[8] U.S. Pat. No. 4,628,403, (Kuisma);

A disadvantage of constructions of prior art technology is that they are difficult to implement in mass production. Further, elimination of temperature-dependent errors to a reasonable level has previously been unsuccessful.

The aim of the present invention is to overcome the disadvantages of the prior art technology and achieve a totally new kind of capacitor construction for use in pressure transducers.

The invention is based on use of a second capacitor integrated to the capacitor construction for temperature compensation of the transducer. A particularly advantageous placement of the compensation capacitor's fixed plate is on the same substrate next to the fixed plate of the sensor capacitor.

More specifically, the capacitor construction in accordance with the invention is characterized by what is stated in the characterizing part of claim 1.

The invention provides outstanding benefits, including:

(a) precision temperature compensation by design of the compensation element into the sensor construction, (b) improved adaptability to mass production and better bondability than with differential capacitors fabricated from similar materials, (see references ([63, [73), and (c) as known from the reference [8], the advantageous dependence of pressure sensitivity in a capacitor is such that it results in a higher sensitivity at low pressures compared with the sensitivity at higher pressures. This property can also be utilized in conjunction with a differential pressure sensor, whereby the pressure $P_1$ in channel 22 must be greater than the pressure $P_2$ in channel 23 (FIG. 3). Compared to symmetrical constructions of differential capacitors shown in references [6] and [7], we now attain a wider usable measurement span with a single sensor element.

It must be noted that the construction in accordance with the invention not only offers compensation of temperature dependence on the dielectric properties of the insulating material but also cancels other causes of temperature-dependent errors, such as those caused by elastic stress properties and thermal expansion characteristics, as well as the thermal expansion of the silicon oil pressure medium if the isolation diaphragms are located close to the sensor element and in good thermal contact with it.

The capacitor construction in accordance with the invention achieves appreciable benefits when the sensor element is attached between the two metal shells of the sensor case using an elastomer so that the sensor capacitor floats between the elastomer cushions. By virtue of its high elasticity, the elastomer does not transmit to the sensor capacitor the mechanical stress caused by the deformation of the metal case or by the differential thermal expansion related to the different expansion coefficients of the sensor capacitor material and the case metal. The location of the sensor capacitor between the two supporting surfaces is fixed so that the imposed pressure difference to be measured cannot stretch the elastomer layer excessively in the direction of its thickness. The shear strength of the elastomer is increased to a sufficient level by using a thin layer in conjunction with a large area.

The invention is next examined in detail with help of the following exemplifying embodiment illustrated in the attached figures.

DETAILED DESCRIPTION OF PREFERRED EMBODIMENTS

Figure 1:
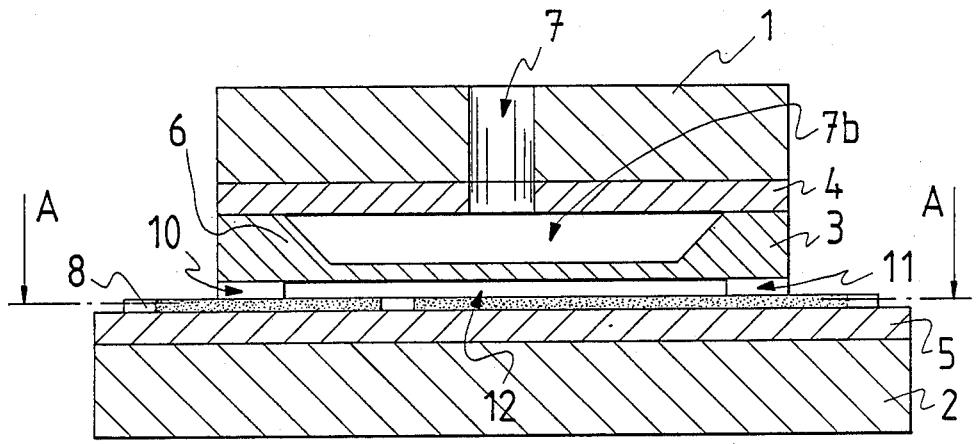
FIG. 1 is a cross-sectional side view of a capacitor construction in accordance with the invention.
Figure 2:
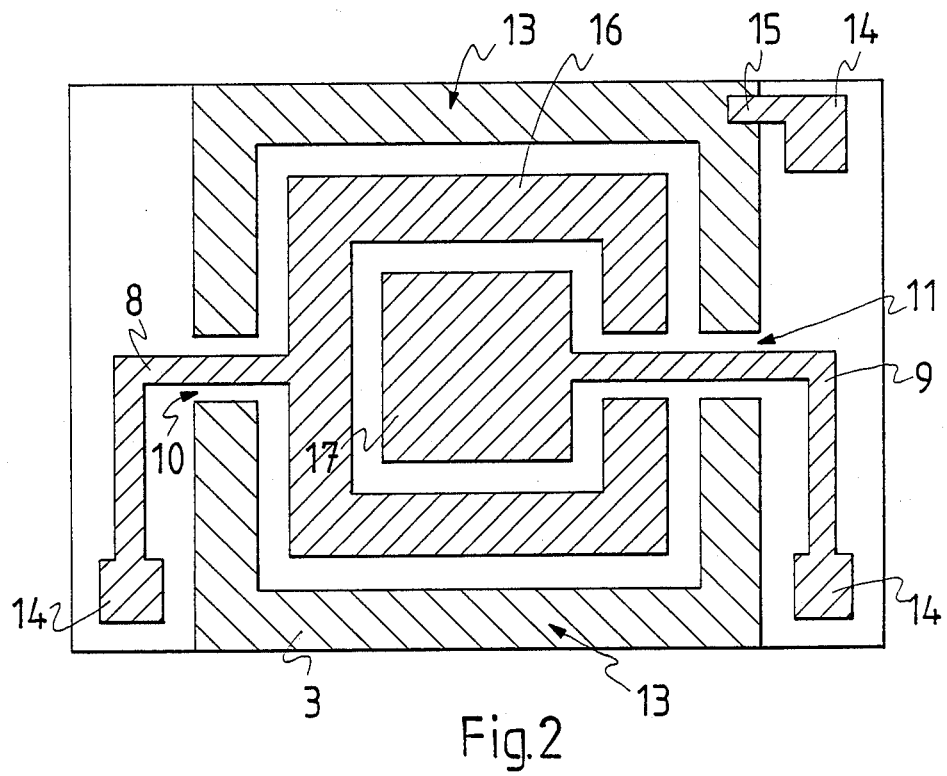
FIG. 2 is a sectional view along plane A—A in FIG. 1.

FIGS. 1 and 2 show the pressure-sensitive part of the sensor's capacitor construction. It is analogous with the construction of FIGS. 3 and 4 in the reference [1]. The capacitor proper consists of layers of different thicknesses of silicon and borosilicate glass with a matched thermal expansion coefficient. In FIG. 1, silicon is the material for a wafer 1. The silicon wafer 1 is bonded to a glass wafer 4 using conventional methods, e.g., those described in references [1] and [2]. Correspondingly, a wafer 2 is fabricated from silicon and bonded to a glass wafer 5. Between these wafer structures remains an element 3, fabricated from silicon. The silicon element 3 is advantageously fabricated to have thicker boundary rims surrounding a thinner center area 6. The silicon element 3 is bonded to the glass wafer surfaces of wafer structures 1, 4 and 2, 5 by its thicker boundary rims using, e.g., an anodic bonding method described in the reference [3].

The silicon element 3 is processed on the side of the glass wafer 5 to have a well-shaped cavity 12, which forms the dielectric gap of the sensor capacitor. The cavity 12 communicates with an external pressure via channels 10 and 11. The other side of the thinned silicon diaphragm 6 has a second well-shaped cavity 7B, which communicates with external pressure via a hole 7 processed into the wafer structure 1, 4. If an external pressure $P_1$ is applied via the hole 7 using a gaseous or liquid pressure medium while a pressure $P_2$ is applied via the channels 10 and 11, the silicon diaphragm 6 will deflect as determined by the pressure difference $P_2-P_1$.

In accordance with FIG. 2, thin-film metallic areas 15, 16, 17, together with their associated conductor areas 8, 9 and bonding pad areas 14 are fabricated onto the surface of the glass wafer 5. The area of anodic bonding is indicated by number 13. The area 15 forms electrical contact with the silicon element 3 and further, via an appropriate conductivity of the silicon material, to the thin silicon diaphragm 6. The areas 17 and 16 of the metallic film are appropriately placed to cover the cavity 12 and the silicon diaphragm 6 so that the area 17 is situated in the middle of the structure where the pressure-differential-induced deflection of the silicon diaphragm 6 is largest while the area 16 is correspondingly situated at the rims where the deflection of the silicon diaphragm 6 is very small. Thus, the construction contains two capacitors: one formed by the area 17 and the silicon diaphragm 6 and the other formed by the area 16 and the silicon diaphragm 6. The cavity 12 is the dielectric insulation gap for both capacitors. The capacitance of the capacitor formed by the area 17 and the silicon diaphragm 6 is denoted by Cp while the capacitance of the capacitor formed by the area 16 and the silicon diaphragm 6 is denoted by Ct, respectively.

The capacitance Cp is strongly dependent on the pressure difference as the varying pressure difference deflects the silicon diaphragm 6 causing variations in the mutual distance between the capacitor plates 6 and 17, and consequently, changes in the capacitance. The capacitance Ct is essentially less dependent on pressure because a negligible change in the mutual distance between the capacitor plates 6 and 16 is caused by pressure difference variations. The dependence of both capacitances Cp and Ct on the dielectric properties of the insulating medium in the gap 12 is essentially equal.

FIGS. 1 and 2 are simplified to illustrate the most essential details of a pressure-differential sensitive capacitor pertinent to its operation. Different modifications in the structures of its elements are feasible as illustrated, e.g., in FIGS. 1 through 6 of the reference [4], and frequently, even advantageous. In addition to the metallic patterns illustrated in FIGS. 1 and 2, the surface of the glass wafer 5 may have guard rings such as shown in FIG. 1B of the reference [4] or the silicon wafer 2 may be bonded to the metallized area by means of a feed-through structure penetrating the glass wafer 5 in accordance with the methods described in the reference [2] or [4].

The dimensions of the pressure-differential sensitive capacitor may vary across a wide range. The width of elements 1, 2, and 3 is typically 20 mm, and preferably 5 to 7 mm. The thicknesses of the elements 1 and 2 are typically 0.2 to 2 mm, and preferably approx. 1 mm. The thickness of the element 3 may be 0.1 to 0.5 mm and preferably 0.38 mm. The thicknesses of the glass wafers 4 and 5 are typically 0.01 to 0.2 mm, and preferably 0.05 mm. The thickness of the thinned silicon diaphragm 6 may vary in the range of 0.005 to 0.2 mm, preferably according to the pressure range, within 0.01 to 0.1 mm, and the length of the silicon diaphragm 6 side (or correspondingly, the diameter of diaphragm circle) is 1 to 10 mm, and preferably 2 to 4 mm. The dielectric distance across the insulation gap 12 is typically in the range of 0.001 to 0.02 mm, and preferably 0.004 0.008 mm.

Figure 3:
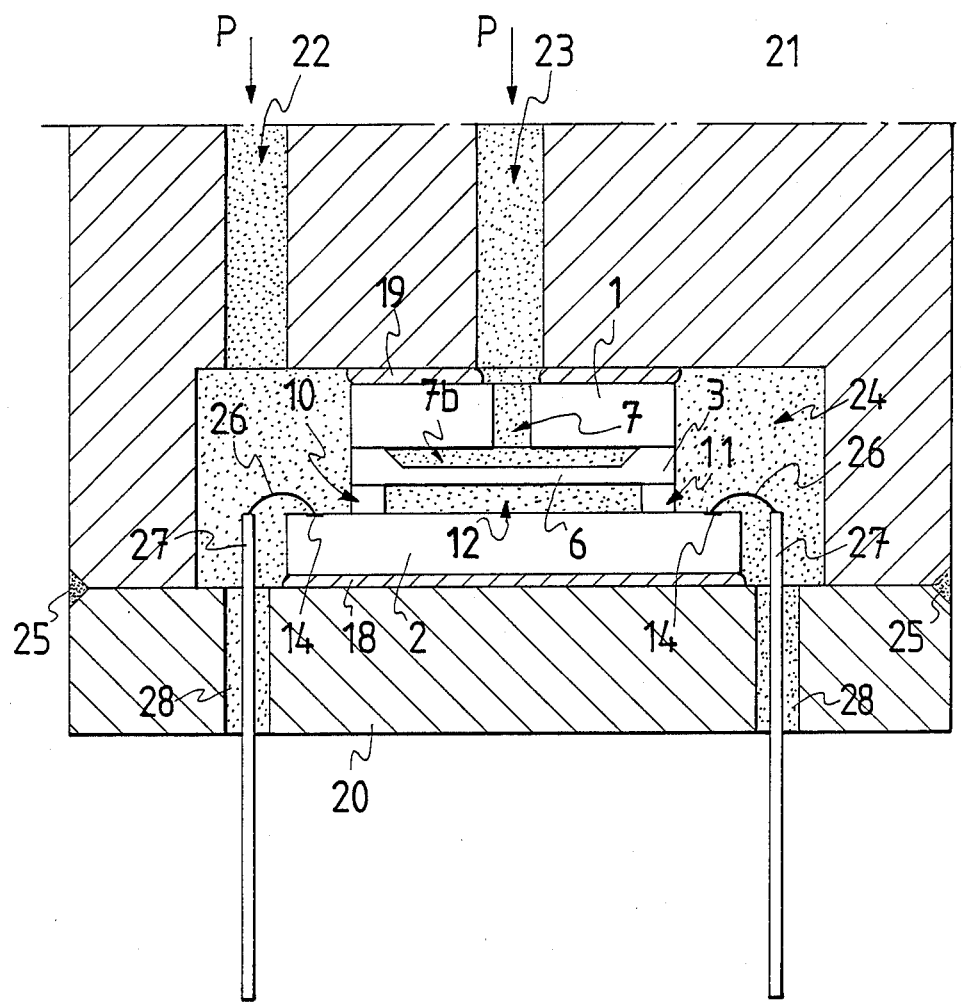
FIG. 3 is a cross-sectional side view of a pressure transducer utilizing the capacitor construction in accordance with the invention.

The application of the capacitor according to FIGS. 1 and 2 as a pressure-sensitive element of a transducer is illustrated in FIG. 3. The capacitor is mounted by the silicon wafer 2 with an appropriately thin layer 18 of a suitable elastomer, e.g. silicon rubber, onto a metallic base 20. The base 20 is provided with feed-through means, in which metallic leads 27 are isolated from the base 20 by glass bushings 28. The glass bushings are melted in place to ensure the hermeticity of the feed-throughs. The bonding areas 14 of the capacitor are appropriately bonded to the corresponding leads 27 by means of thin metallic wires 26. The metallic base 20 is attached by, e.g., welding around a seam 25 to another metallic case part 21, which further may be a part of a larger structure. The case part 21 has a space 24 for the capacitor. The capacitor is mounted by the silicon wafer 1 with a thin elastomer layer 19 to the metallic case part 21. Thus, the capacitor is floating between two elastomer cushions. The elastomer layers have a thickness of 0.05 0.3 mm, and preferably 0.1 mm.

The metallic case part 21 has two boreholes 22 and 23, through which the measured pressures are applied to the capacitor. The borehole 22 communicates with space 24, while the borehole 23 is aligned with a hole 7 of the capacitor plate 1. An elastomer layer 19 isolates these two pressure channels from each other. The space 24 is filled with a liquid pressure medium, e.g., silicone oil, so that the medium also fills the dielectric gap cavity 12 through the channels 10 and 11. The borehole 23 and the cavity 7B communicating with it through the hole 7 are also filled with a medium, which may be a liquid or a gas, such as air.

The boreholes 22 and 23 may further be communicating with the oil medium spaces, which are isolated from the measured pressure medium by a thin metallic diaphragm in the same manner as described for example in references [5] and [6]. If the transducer is not used for differential pressure measurement but instead for gage measurement, the borehole 23 need not be filled with a liquid medium nor is the associated isolating diaphragm necessary. The space 24 may be appropriately shaped according to the dimensions of the sensor capacitor to minimize the volume of the medium.

The capacitor construction described in the foregoing has two measurable capacitances, Cp and Ct. Of these, Cp is strongly dependent on the pressure differential while Ct has a weak dependence, both capacitances being dependent on the dielectric properties of the medium.

If the medium filling the cavity 12 is silicone oil, the temperature coefficient of dielectric constant is high, approx. 1000 ppm/K. This causes a high temperature dependence of the capacitances Cp and Ct which might induce temperaturedependent error in the pressure measurement in the case that capacitance Cp would alone be utilized for the measurement of pressure difference. Since a second capacitance Ct with a different pressure relationship than that of Cp is also available with a strong temperature dependence, too, mathematical functions can be formulated to find from the capacitances values for both the pressure difference and temperature with a sufficient accuracy.

$$P_2 - P_1 = p(Cp, Ct)$$

$$t = t(Cp, Ct)$$

The functions p and t may be formulated, for example, in polynomial form. The coefficients of polynoms can be determined by measuring the two capacitances, Cp and Ct, at a sufficient number of values for pressure difference and temperature.

What is claimed is:
 1. A capacitor construction for use in pressure transducers, comprising:
   a supporting substrate plate consisting of a silicon wafer and a glass wafer attached onto said silicon wafer by an electrostatic bonding method, said glass wafer being essentially thinner than the silicon wafer;

a first fixed capacitor plate overlying the substrate plate;

a silicon plate overlying the substrate plate to encircle the fixed capacitor plate, said silicon plate having a center part thinned to perform as a diaphragm acting as the moving capacitor plate so that well-shaped cavities are formed above and under the diaphragm structure for introduction of the measured pressure medium;

a top plate overlying the silicon plate, said top plate consisting of a silicon wafer and of a glass wafer attached onto said silicon wafer and placed against the silicon plate, said glass wafer being essentially thinner than the silicon wafer; and a second capacitor plate overlying the supporting substrate plate between the first capacitor plate and the silicon plate which encircles the first capacitor plate in such a manner so as to essentially enclose the first capacitor plate;

whereby the second capacitor plate together with the center part of the silicon plate forms a compensating capacitor, whose capacitance (Ct) is essentially less dependent on displacement of the center part of the silicon plate than the capacitance (Cp) formed by the first capacitor plate and the center part of the silicon plate.

2. A capacitor construction in accordance with claim 1, wherein the shape of the second capacitor plate is essentially that of the circumference of a rectangle.

3. A capacitor construction in accordance with claim 1, wherein the top plate is provided with a channel penetrating the silicon wafer and the glass wafer so that the measured pressure medium can be introduced through the channel into an upper cavity formed above the diaphragm in order to permit the measurement of pressure difference.

* * * * *